US012615436B2

(12) United States Patent
Onishi et al.

(10) Patent No.: US 12,615,436 B2
(45) Date of Patent: Apr. 28, 2026

(54) INSPECTION-TARGET-IMAGE TRANSMISSION SYSTEM, INSPECTION-TARGET-IMAGE TRANSMISSION METHOD, AND PROGRAM

(71) Applicant: LILZ INC., Ginowan (JP)

(72) Inventors: Keigo Onishi, Ginowan (JP); Makoto Otsuka, Ginowan (JP); Jakub Kolodziejczyk, Ginowan (JP); Taiki Nishime, Ginowan (JP)

(73) Assignee: LILZ INC., Ginowan (JP)

( * ) Notice: Subject to any disclaimer, the term of this patent is extended or adjusted under 35 U.S.C. 154(b) by 66 days.

(21) Appl. No.: 18/713,282

(22) PCT Filed: Nov. 24, 2021

(86) PCT No.: PCT/JP2021/043028
§ 371 (c)(1),
(2) Date: May 24, 2024

(87) PCT Pub. No.: WO2023/095214
PCT Pub. Date: Jun. 1, 2023

(65) Prior Publication Data
US 2025/0024141 A1      Jan. 16, 2025

(51) Int. Cl.
*H04N 23/661*        (2023.01)
*H04N 7/18*          (2006.01)
*H04N 23/65*         (2023.01)

(52) U.S. Cl.
CPC ........... *H04N 23/661* (2023.01); *H04N 7/183* (2013.01); *H04N 23/651* (2023.01)

(58) Field of Classification Search
CPC .... H04N 23/661; H04N 7/183; H04N 23/651; H04N 7/18
See application file for complete search history.

(56) References Cited

U.S. PATENT DOCUMENTS

2013/0120598 A1*   5/2013   Iwasaki ................ H04N 23/661
                                                       348/222.1
2018/0316842 A1    11/2018  Taoki
2019/0174098 A1*    6/2019  Smith .................. H04N 23/661

FOREIGN PATENT DOCUMENTS

JP        2007-228315 A      9/2007
JP        2008-283484 A      11/2008
(Continued)

OTHER PUBLICATIONS

International Search Report from International Application No. PCT/JP2021/043028 Jan. 25, 2022, 6 pgs.
(Continued)

*Primary Examiner* — Yogesh K Aggarwal
(74) *Attorney, Agent, or Firm* — Tutunjian & Bitetto, P.C.

(57) ABSTRACT

An inspection-target-image transmission system causes the camera to periodically confirm whether a shooting condition instruction and a trimming condition instruction are present in a storage place. The system causes the camera to change a shooting condition on the basis of the shooting condition instruction, the presence of which has been confirmed and then shoot the image of the inspection target. The system causes the camera to change a trimming condition on the basis of the trimming condition instruction, the presence of which has been confirmed, and then trim the image of the inspection target. The system further causes the camera to switch from a standby communication method to a transmission communication method and then transmit the trimmed image. Finally, the system causes the camera to switch from the transmission communication method to the standby communication method after the transmission is completed and to stand by.

15 Claims, 12 Drawing Sheets

(56)     References Cited

FOREIGN PATENT DOCUMENTS

| | | | |
|---|---|---|---|
| JP | 2009-200702 | A | 9/2009 |
| JP | 2013-62696 | A | 4/2013 |
| JP | 2014-063378 | A | 4/2014 |
| JP | 2017-163300 | A | 9/2017 |
| JP | 2018-191051 | A | 11/2018 |
| WO | 2013-072980 | A1 | 5/2013 |
| WO | 2019-049455 | A1 | 3/2019 |
| WO | 2020256120 | A1 | 12/2020 |

OTHER PUBLICATIONS

European Search Report from European Application No. 21965588.
3, Feb. 13, 2025, 7 pgs.

\* cited by examiner

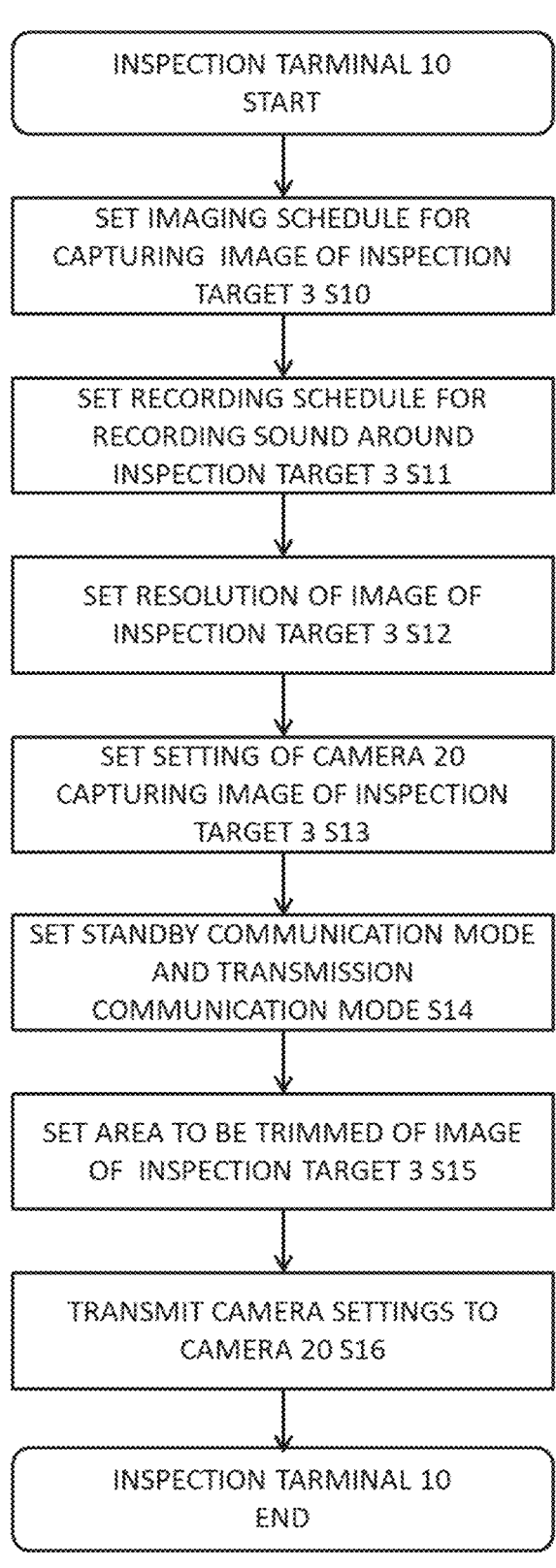

INSPECTION TARMINAL 10
START

SET IMAGING SCHEDULE FOR
CAPTURING IMAGE OF INSPECTION
TARGET 3 S10

SET RECORDING SCHEDULE FOR
RECORDING SOUND AROUND
INSPECTION TARGET 3 S11

SET RESOLUTION OF IMAGE OF
INSPECTION TARGET 3 S12

SET SETTING OF CAMERA 20
CAPTURING IMAGE OF INSPECTION
TARGET 3 S13

SET STANDBY COMMUNICATION MODE
AND TRANSMISSION
COMMUNICATION MODE S14

SET AREA TO BE TRIMMED OF IMAGE
OF INSPECTION TARGET 3 S15

TRANSMIT CAMERA SETTINGS TO
CAMERA 20 S16

INSPECTION TARMINAL 10
END

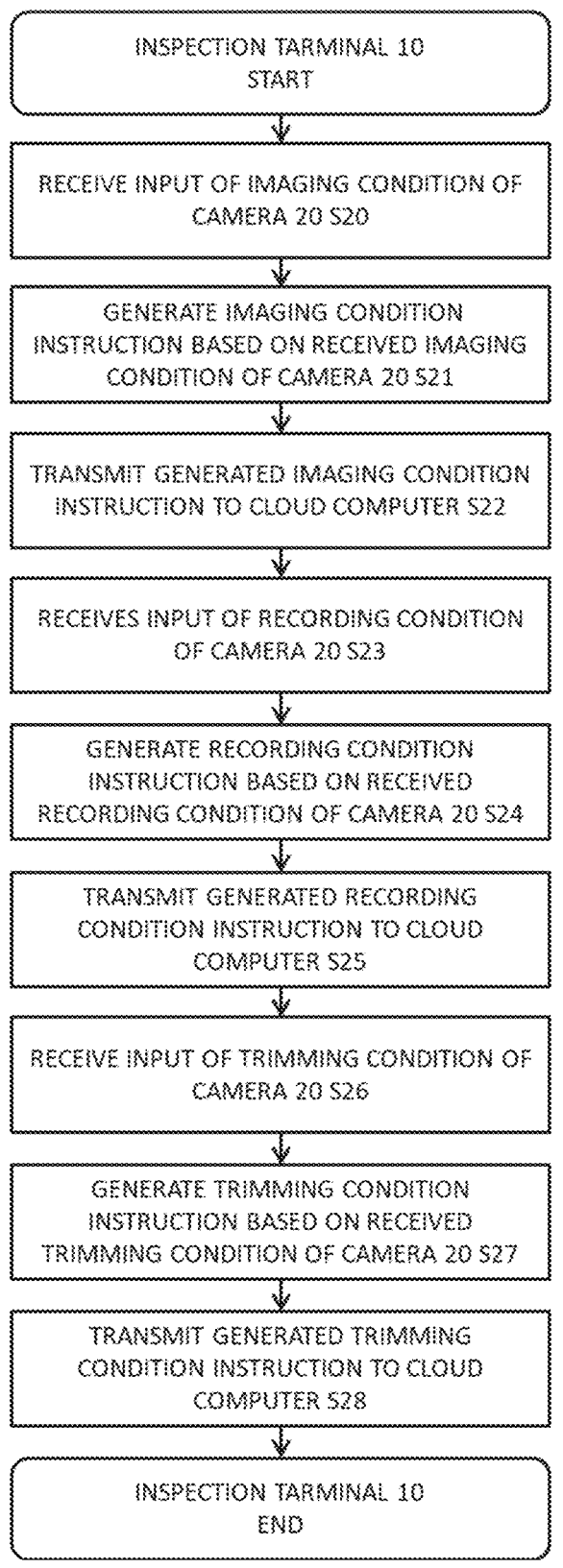

INSPECTION TARMINAL 10
START

RECEIVE INPUT OF IMAGING CONDITION OF CAMERA 20 S20

GENERATE IMAGING CONDITION INSTRUCTION BASED ON RECEIVED IMAGING CONDITION OF CAMERA 20 S21

TRANSMIT GENERATED IMAGING CONDITION INSTRUCTION TO CLOUD COMPUTER S22

RECEIVES INPUT OF RECORDING CONDITION OF CAMERA 20 S23

GENERATE RECORDING CONDITION INSTRUCTION BASED ON RECEIVED RECORDING CONDITION OF CAMERA 20 S24

TRANSMIT GENERATED RECORDING CONDITION INSTRUCTION TO CLOUD COMPUTER S25

RECEIVE INPUT OF TRIMMING CONDITION OF CAMERA 20 S26

GENERATE TRIMMING CONDITION INSTRUCTION BASED ON RECEIVED TRIMMING CONDITION OF CAMERA 20 S27

TRANSMIT GENERATED TRIMMING CONDITION INSTRUCTION TO CLOUD COMPUTER S28

INSPECTION TARMINAL 10
END

FIG. 6

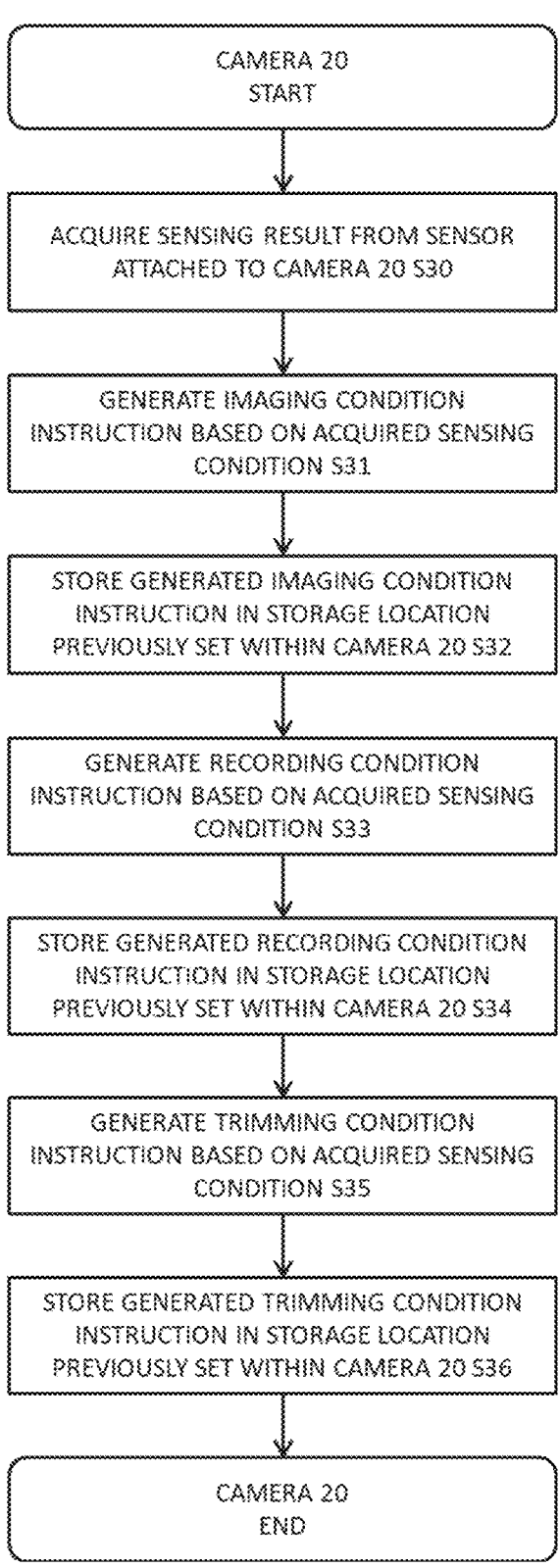

CAMERA 20
START

ACQUIRE SENSING RESULT FROM SENSOR
ATTACHED TO CAMERA 20 S30

GENERATE IMAGING CONDITION
INSTRUCTION BASED ON ACQUIRED SENSING
CONDITION S31

STORE GENERATED IMAGING CONDITION
INSTRUCTION IN STORAGE LOCATION
PREVIOUSLY SET WITHIN CAMERA 20 S32

GENERATE RECORDING CONDITION
INSTRUCTION BASED ON ACQUIRED SENSING
CONDITION S33

STORE GENERATED RECORDING CONDITION
INSTRUCTION IN STORAGE LOCATION
PREVIOUSLY SET WITHIN CAMERA 20 S34

GENERATE TRIMMING CONDITION
INSTRUCTION BASED ON ACQUIRED SENSING
CONDITION S35

STORE GENERATED TRIMMING CONDITION
INSTRUCTION IN STORAGE LOCATION
PREVIOUSLY SET WITHIN CAMERA 20 S36

CAMERA 20
END

FIG. 7

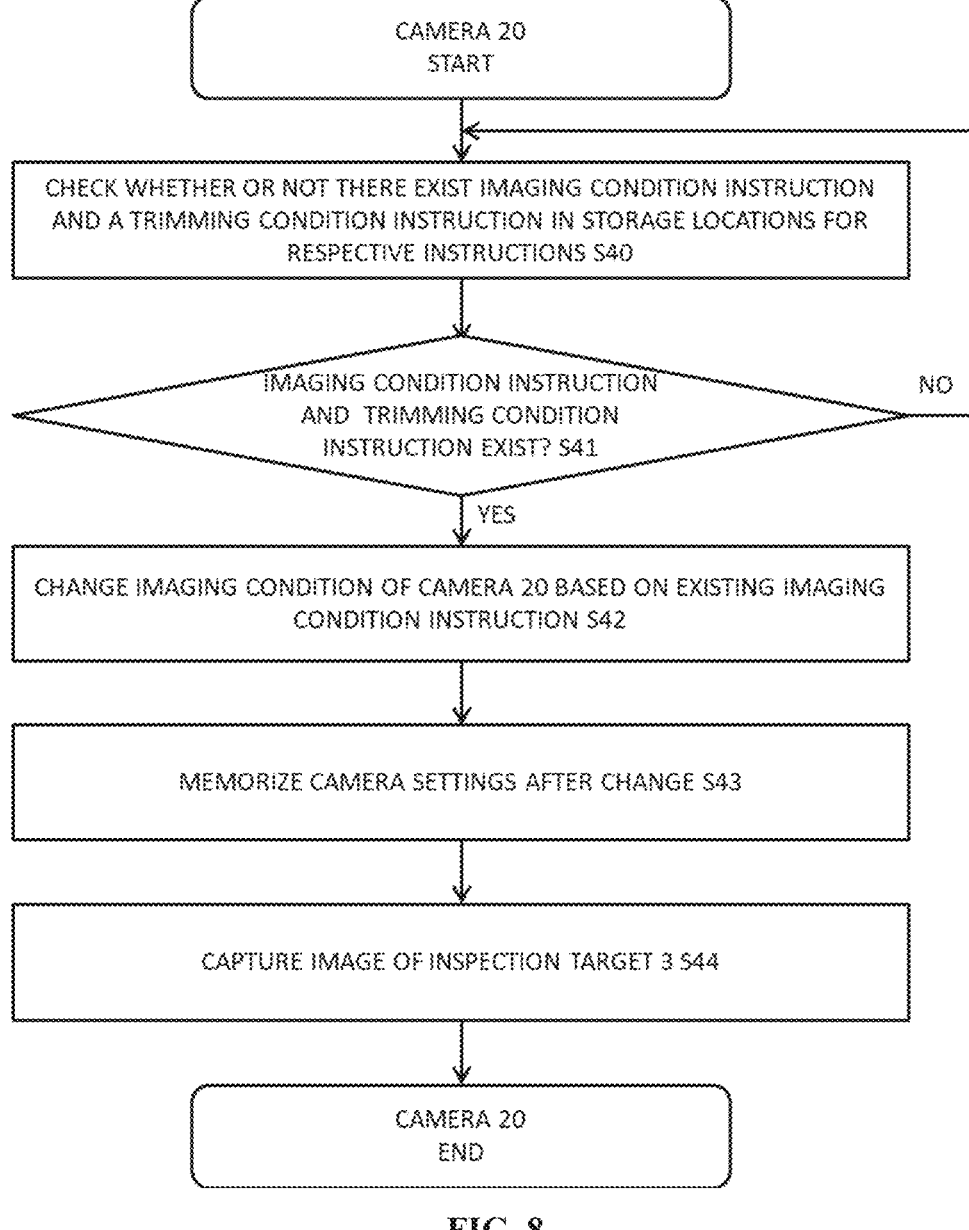

CAMERA 20
START

CHECK WHETHER OR NOT THERE EXIST IMAGING CONDITION INSTRUCTION AND A TRIMMING CONDITION INSTRUCTION IN STORAGE LOCATIONS FOR RESPECTIVE INSTRUCTIONS S40

IMAGING CONDITION INSTRUCTION AND TRIMMING CONDITION INSTRUCTION EXIST? S41

NO

YES

CHANGE IMAGING CONDITION OF CAMERA 20 BASED ON EXISTING IMAGING CONDITION INSTRUCTION S42

MEMORIZE CAMERA SETTINGS AFTER CHANGE S43

CAPTURE IMAGE OF INSPECTION TARGET 3 S44

CAMERA 20
END

FIG. 8

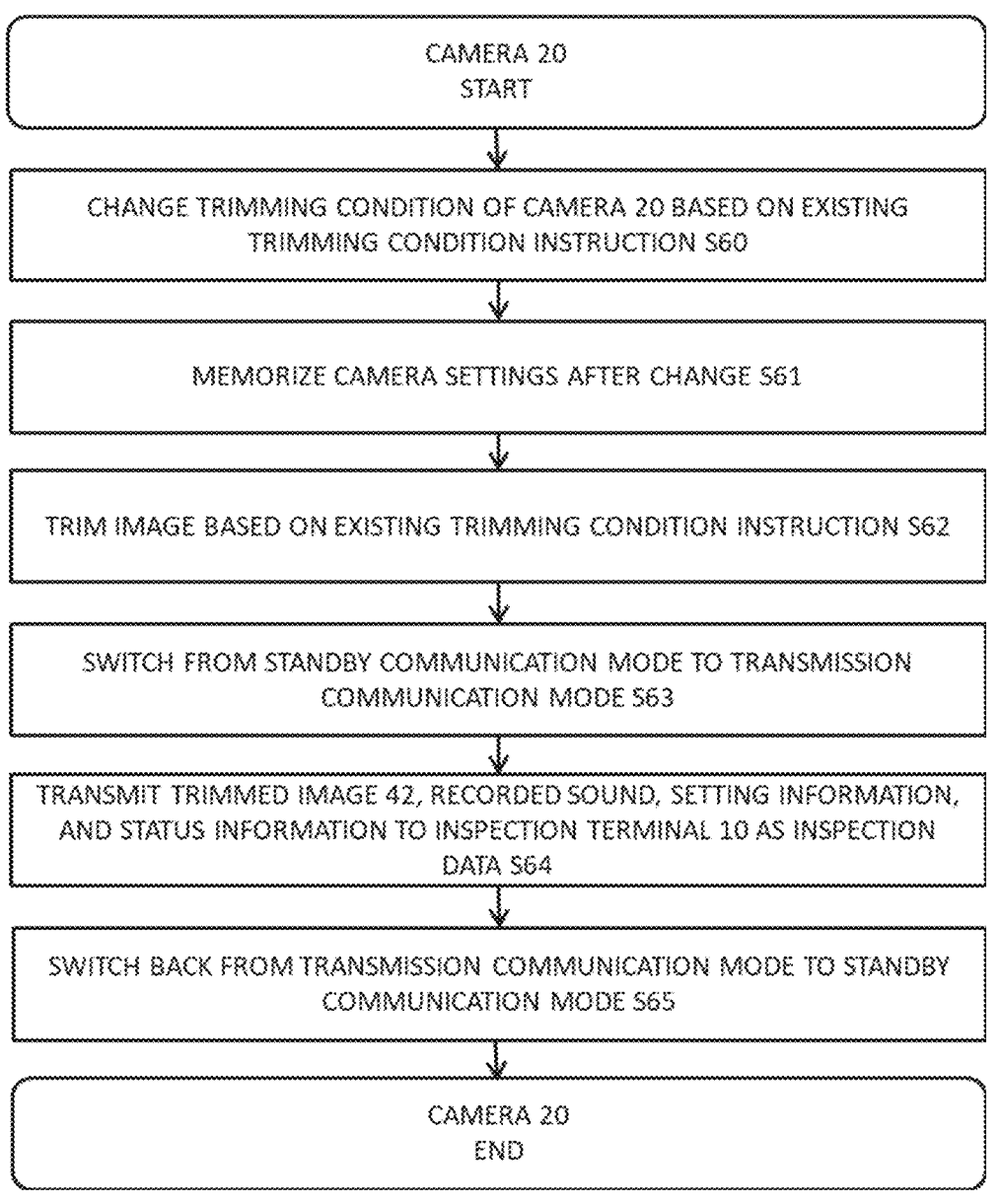

CAMERA 20
START

CHANGE TRIMMING CONDITION OF CAMERA 20 BASED ON EXISTING
TRIMMING CONDITION INSTRUCTION S60

MEMORIZE CAMERA SETTINGS AFTER CHANGE S61

TRIM IMAGE BASED ON EXISTING TRIMMING CONDITION INSTRUCTION S62

SWITCH FROM STANDBY COMMUNICATION MODE TO TRANSMISSION
COMMUNICATION MODE S63

TRANSMIT TRIMMED IMAGE 42, RECORDED SOUND, SETTING INFORMATION,
AND STATUS INFORMATION TO INSPECTION TERMINAL 10 AS INSPECTION
DATA S64

SWITCH BACK FROM TRANSMISSION COMMUNICATION MODE TO STANDBY
COMMUNICATION MODE S65

CAMERA 20
END

INSPECTION-TARGET-IMAGE TRANSMISSION SYSTEM, INSPECTION-TARGET-IMAGE TRANSMISSION METHOD, AND PROGRAM

CROSS-REFERENCE TO RELATED APPLICATION

This application is a national stage of International Application No. PCT/JP2021/043028 filed on Nov. 21, 2021, which is incorporated herein by reference in its entirety

TECHNICAL FIELD

The present disclosure relates to a technology to conduct remote inspection.

BACKGROUND

In recent years, technologies have been provided to improve inspection efficiency at inspection sites. For example, to further improve the convenience of facility inspection management, Patent Document 1 (JP2014-63378 A) provides a technology to place the name of each facility to be inspected in the date field of a calendar corresponding to the day when the inspection is to be carried out, receives an image from a camera-equipped mobile terminal, and judges whether or not a facility inspection image for the name of each facility displayed on the calendar has been received, and changes the display color on the monitor of the name of a facility for which a facility inspection image has been received.

Additionally, Patent Document 2 (JP2007-228315 A) provides a technology that facilitates tasks such as three-dimensional imaging of structures in a building and checking the positions of embedded objects within walls during construction and inspection of structures in a building.

SUMMARY

The Technical Problem Solved by the Disclosure

At an inspection site, to confirm the status of an inspection target, such as what a meter is indicating, whether or not a container is full, whether or not a streetlight is out, whether an animal has been caught in a trap, or what the water level is in a river, an inspection worker travels to the inspection site and conducts visual inspection. Therefore, the poor inspection efficiency has become an issue, and there is a growing demand for remote inspection using camera, etc. However, when conducting remote inspection without going to an inspection site, it becomes important for a camera, etc., to save power, as such an inspection site often lacks a power source.

Therefore, there is a need for the technology to have a camera, which captures an image of an inspection target, periodically check whether or not there exist an imaging condition instruction and a trimming condition instruction in storage locations for the respective instructions, change the imaging condition and capture an image of an inspection target based on the existing imaging condition instruction, change the trimming condition and trim the image of the inspection target, the image having been captured by the camera, based on the existing trimming condition instruction, switch from a standby communication mode to a transmission communication mode and transmit the trimmed image of the inspection target, and switch back from the transmission communication mode to the standby communication mode when the image transmission is completed, which enables remote inspection with power saving and improves inspection efficiency.

However, the technologies described in Patent Documents 1 and 2 are unable to have a camera, which captures an image of an inspection target, periodically check whether or not there exist an imaging condition instruction and a trimming condition instruction in storage locations for the respective instructions, change the imaging condition and capture an image of an inspection target based on the existing imaging condition instruction, change the trimming condition and trim the image of the inspection target, the image having been captured by the camera, based on the existing trimming condition instruction, switch from a standby communication mode to a transmission communication mode and transmit the trimmed image of the inspection target, and switch back from the transmission communication mode to the standby communication mode when the image transmission is completed, which do not enable remote inspection with power saving or make it possible to achieve power saving by improving inspection efficiency.

An objective of the present disclosure is to provide an inspection-target-image transmission system, inspection-target-image transmission method, and program that have a camera, which captures an image of an inspection target, periodically check whether or not there exist an imaging condition instruction and a trimming condition instruction in storage locations for the respective instructions, change the imaging condition and capture an image of an inspection target based on the existing imaging condition instruction, change the trimming condition and trim the image of the inspection target, the image having been captured by the camera, based on the existing trimming condition instruction, switch from a standby communication mode to a transmission communication mode and transmit the trimmed image of the inspection target, and switch back from the transmission communication mode to the standby communication mode when the image transmission is completed, which enables remote inspection with power saving and makes it possible to achieve power saving by improving inspection efficiency.

Solution for Solving the Technical Problem

The present disclosure provides an inspection-target-image transmission system that transmits an image of an inspection target, the image having been captured by a camera, including:

a check unit that has the camera periodically check whether or not there exist an imaging condition instruction and a trimming condition instruction in storage locations for the respective instructions;

an imaging unit that has the camera change the imaging condition and capture an image of an inspection target based on the existing imaging condition instruction;

a trimming unit that has the camera change the trimming condition and trim the image of the inspection target, the image having been captured by the camera, based on the existing trimming condition instruction;

a transmission unit that has the camera switch from a standby communication mode to a transmission communication mode and transmit the trimmed image of the inspection target; and a standby unit that has the camera switch back from the transmission communication mode to the standby communication mode when the image transmission is completed.

According to the present disclosure, an inspection-target-image transmission system that transmits an image of an inspection target, the image having been captured by a camera, has a camera, which captures an image of an inspection target, periodically check whether or not there exist an imaging condition instruction and a trimming condition instruction in storage locations for the respective instructions, change the imaging condition and capture an image of an inspection target based on the existing imaging condition instruction, change the trimming condition and trim the image of the inspection target, the image having been captured by the camera, based on the existing trimming condition instruction, switch from a standby communication mode to a transmission communication mode and transmit the trimmed image of the inspection target, and switch back from the transmission communication mode to the standby communication mode when the image transmission is completed.

The present disclosure is categorized as a system, but the same functions and effects can be achieved even if the present disclosure is categorized as a method and a program.

Technical Effect

The present disclosure enables remote inspection with power saving and makes it possible to achieve power saving by improving inspection efficiency.

BRIEF DESCRIPTION OF THE DRAWINGS

FIG. 3 shows the camera setting process executed by the inspection-target-image transmission system 1.

FIG. 6 shows the first instruction generation process executed by the inspection-target-image transmission system 1.

FIG. 7 shows the second instruction generation process executed by the inspection-target-image transmission system 1.

FIG. 8 shows the imaging process executed by the inspection-target-image transmission system 1.

FIG. 10 shows a flowchart of the inspection data transmission process executed by the inspection-target-image transmission system 1.

DESCRIPTION OF REFERENCE NUMERALS

Figure 1:
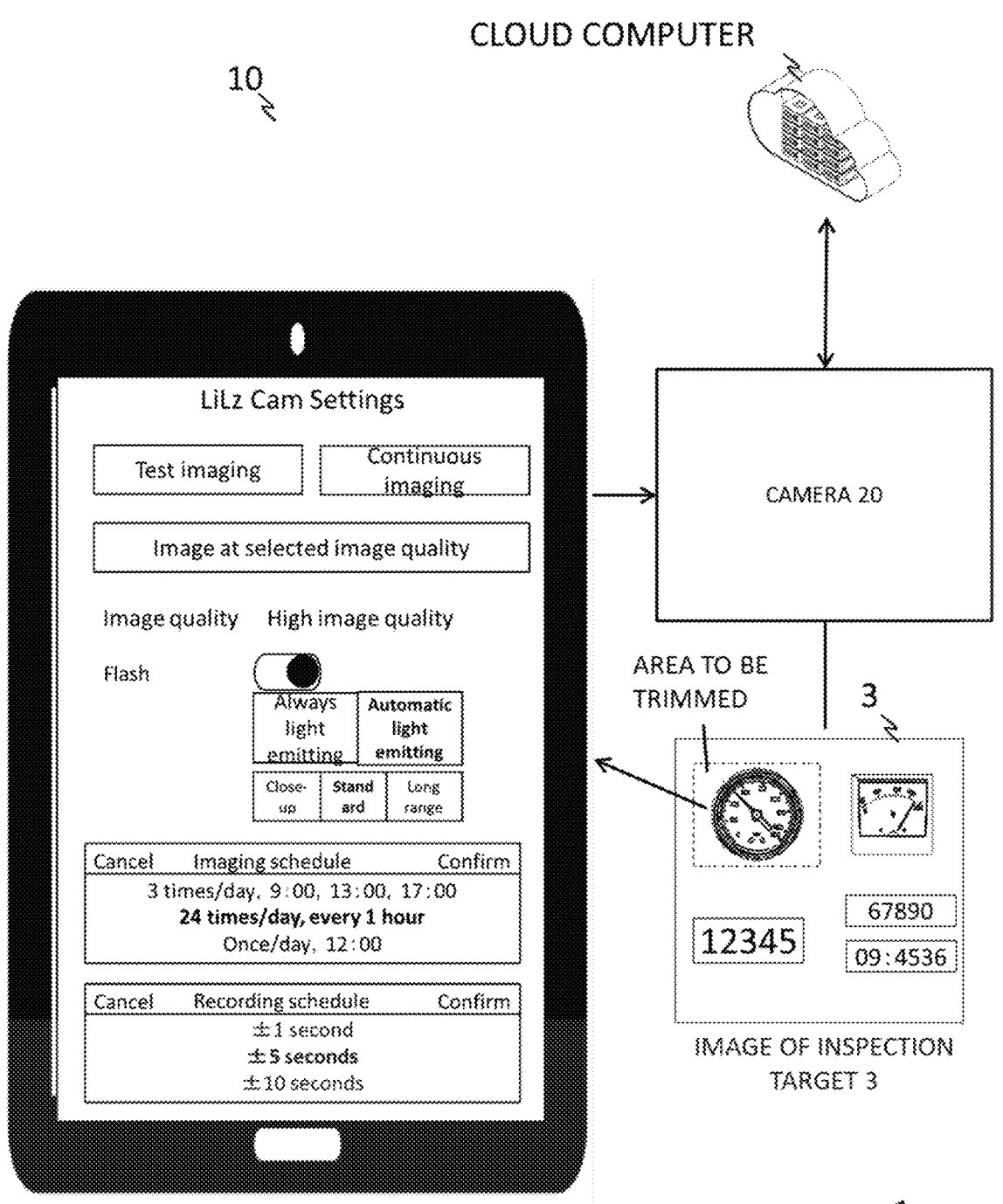
FIG. 1 is a diagram illustrating the overview of the inspection-target-image transmission system 1.

1: inspection-target-image transmission system, 3: inspection target, 9: network, 10: inspection terminal, 20:

camera, 21: check unit, 22: transmission unit, 23: imagine unit, 24: trimming unit, 25: standby unit, 30, 40: image of inspection target, 31, 41: area to be trimmed, 42: trimmed image.

DETAILED DESCRIPTION OF THE EMBODIMENTS

Hereinafter, embodiments to carry out the present disclosure (hereinafter referred to as "Embodiments" is described below in detail with reference to the attached drawings. In the drawings, the same components throughout the description of Embodiments are designated by the same reference numerals.

Basic Concept/Basic Configuration

FIG. 1 is a diagram illustrating the overview of the inspection-target-image transmission system 1. The inspection-target-image transmission system 1 includes an inspection terminal 10 that is carried by an inspection worker conducting an inspection task and a camera 20 that captures an image of an inspection target 3, records a sound around the inspection target 3, and transmits the captured image and the recorded sound to the inspection terminal 10. The inspection terminal 10 and the camera 20 are data-communicatively connected with each other. The camera 20 is a device capable of capturing an image, such as a visible light camera, an X-ray camera, or a magnetic resonance camera. The image is a still or moving image.

In this Embodiment, the inspection target 3 is assumed to be a meter (e.g. circular, rectangular, seven-segment, counter, bar, or lamp meter), and the camera 20 is assumed to be placed in a position capable of capturing an image of this meter. Furthermore, the various processes executed by the inspection terminal 10 are assumed to be performed by a predetermined application.

The camera 20 periodically checks whether or not there exist an imaging condition instruction and a trimming condition instruction in storage locations for the respective instructions (Step S1).

The imaging condition relates to imaging, for example, imaging schedule, imaging timing, imaging frequency, imaging duration, imaging range, and also relates to the settings of the camera 20 itself, such as resolution, flash-enabled or disabled, flash intensity, automatic light emitting-enabled or disabled, EV (Exposure Value), and shutter speed. The imaging condition instruction is for providing the imaging condition to the camera 20.

The trimming condition relates to, for example, an area to be trimmed from the image of an inspection target 3, which has been captured by the camera 20. The term "trimming" herein means to cut out only a specified area, delete all the other areas as unnecessary, and generate an image of only the specified area. The trimming condition instruction is for providing the trimming condition to the camera 20.

The storage locations for the instructions are, for example, on a cloud computer or a camera 20 itself, which represent physical or virtual locations where the imaging condition instruction and the trimming condition instruction are stored.

The inspection terminal 10 receives input of an imaging condition and a trimming condition and generates an imaging condition instruction and a trimming condition instruction, respectively, based on the received conditions. The inspection terminal 10 transmits the imaging condition instruction and the trimming condition instruction to the storage locations for the respective instructions on a cloud computer. The cloud computer receives the imaging condition instruction and the trimming condition instruction and stores them in the storage location set within the camera 20 itself.

Alternatively, the camera 20 generates an imaging condition instruction and a trimming condition instruction based on a sensing result (e.g. detection of a pressed imaging button or a moving object) from a pressure sensor, an infrared sensor, etc., attached to the cloud computer itself, and stores the imaging condition instruction and trimming condition instruction, which have been generated, in the respective storage locations set within the camera 20 itself.

The camera 20 periodically checks whether there exist an imaging condition instruction and a trimming condition instruction in the respective storage locations set on the cloud computer or within the camera 20 itself.

The camera 20 changes the imaging condition and captures an image of an inspection target based on the existing imaging condition instruction (Step S2).

The camera 20 changes the imaging condition by overwriting the entire or a part of the previous imaging condition with the imaging condition based on the existing imaging condition instruction. The camera 20 captures an image of an inspection target 3 based on the changed imaging condition.

The camera 20 trims the image of the inspection target 3, the image having been captured by the camera, based on the existing trimming condition instruction (Step S3).

The camera 20 changes the trimming condition by overwriting the entire or a part of the previous trimming condition with the trimming condition based on the existing trimming condition instruction. The camera 20 trims the image of the inspection target 3 based on the changed trimming condition. The camera 20 cuts out only an area specified in the trimming condition and delete all the other areas as unnecessary. In other words, the camera 20 generates an image of only the area specified in the trimming condition.

The camera 20 switches from a standby communication mode to a transmission communication mode and transmits the trimmed image of the inspection target 3 (Step S4).

The camera 20 switches from a standby communication mode, which is the communication state during standby (not transmitting an image), to a transmission communication mode, which is the communication state for transmission (transmitting an image) and transmits the trimmed image of the inspection target 3 to the inspection terminal 10.

The camera 20 switches back from the transmission communication mode to the standby communication mode when the image transmission is completed (Step S5).

For example, the communication mode involves a standby communication mode where the average consumption current per hour is 1 mA or less, and a transmission communication mode where the average consumption current per hour is more than 1 mA.

The inspection terminal 10 receives the trimmed image of the inspection target 3 transmitted by the camera 20. By viewing this image, an inspection worker conducts remote inspection for the inspection target 3.

The inspection-target-image transmission system 1 described above is composed of an inspection terminal 10 and a camera 20 but may be composed of an inspection terminal 10, a computer (e.g. a computer or a cloud computer with server functions), and a camera 20 In this case, the process of generating an imaging condition instruction and a trimming condition instruction, the process of transmitting these instructions, and the process of receiving an image, which are executed by the above-mentioned inspection terminal 10 are performed through a computer. Specifically, the computer receives various inputs from the inspection terminal 10, executes the necessary process for the received input, receives an image from the camera 20, and has the inspection terminal 10 displays this image.

Such an inspection-target-image transmission system 1 enables remote inspection with power saving and makes it possible to achieve power saving by improving inspection efficiency.

Functional Configuration

Figure 2:
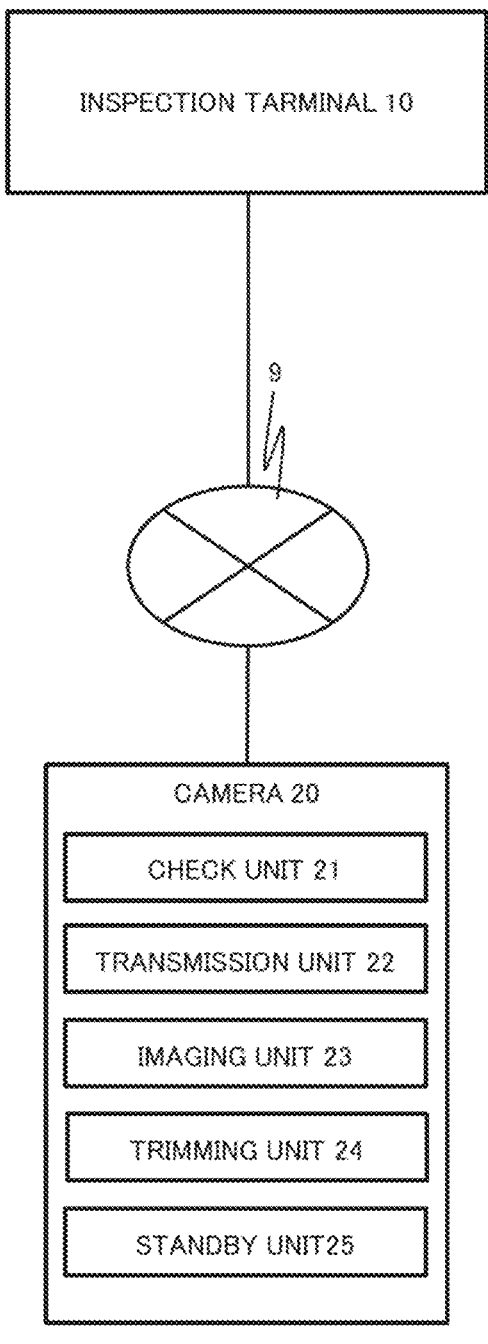
FIG. 2 is a diagram illustrating the functional configuration of the inspection-target-image transmission system 1.

The functional configuration of the inspection-target-image transmission system 1 is described below with reference to FIG. 2.

The inspection-target-image transmission system 1 includes an inspection terminal 10 and a camera 20 placed at a predetermined location around the inspection target 3, which are data-communicatively connected with each other through a network 9 such as a public line network.

The inspection-target-image transmission system 1 may also include other terminals and devices. In this case, the inspection-target-image transmission system 1 executes the processes described later by any one of or any combination of the inspection terminal 10, the camera 20, and other terminals and devices.

In the following description, the inspection target 3 is a meter as described above.

The inspection-target-image transmission system 1 may include a personal computer, a computer, or a cloud computer consisting of multiple computers with server functions in addition to an inspection terminal 10 and a camera 20. The term "cloud computer" herein may scalably utilizes any computer to perform a specific function or include multiple functional modules to realize a system, where the functions can be freely combined and used.

In this case, in the inspection-target-image transmission system 1, the cloud computer executes the various processes executed by the inspection terminal 10 to be described later, and outputs the results of the processes to the inspection terminal 10 and the camera 20 or stores the results of the processes executed by the inspection terminal 10 on the cloud computer and outputs them to the camera 20 upon request from the camera 20.

The inspection terminal 10 includes a mobile device such as a smartphone or a tablet terminal that is carried by an inspection worker, a computer such as a personal computer, and an HMD (Head Mounted Display) like smart glasses.

The inspection terminal 10 is provided with a control unit that includes a CPU (Central Processing Unit), GPU (Graphics Processing Unit), RAM (Random Access Memory), and ROM (Read Only Memory); and a communication unit that includes devices to enable communication with other terminals and devices.

The inspection terminal 10 also includes a processing unit that includes various devices to execute various processes.

In the inspection terminal 10, by loading a predetermined program, the control unit cooperates with the communication unit to implement a test image acquisition module, a camera setting transmission module, an imaging condition instruction transmission module, a recording condition instruction transmission module, a trimming condition instruction transmission module, and an inspection data reception module.

Furthermore, in the inspection terminal 10, by loading a predetermined program, the control unit cooperate with the processing unit to implement an imaging schedule setting module, a recording schedule setting module, a resolution setting module, a camera setting module, a communication mode setting module, a trimming setting module, an imaging condition input reception module, an imaging condition instruction generation module, a recording condition input reception module, a recording condition instruction generation module, a trimming condition input reception module, and a trimming condition instruction generation module.

The camera 20 is a device placed at a predetermined location around an inspection target 3, which captures an image, records a sound, and transmits the image, for example.

The camera 20, similar to the inspection terminal 10, provided with a control unit that includes a CPU (Central Processing Unit), GPU (Graphics Processing Unit), RAM (Random Access Memory), and ROM (Read Only Memory); and a communication unit that includes devices to enable communication with other terminals and devices. The camera 20 is also provided with a check unit 21 that periodically check whether or not there exist an imaging condition instruction and a trimming condition instruction in a storage location, and a transmission unit 22 that switches from a standby communication mode to a transmission communication mode and transmits the trimmed image to the inspection terminal 10.

The camera 20 includes a storage unit as a memory unit that includes a hard disk, a semiconductor memory, a memory medium, and a memory card.

The camera 20 also includes a processing unit that includes devices that execute various processes, an imaging unit 23 that captures an image of an inspection target 3, a trimming unit 24 that trims the captured images, and a standby unit 25 that switches back from the transmission communication mode to the standby communication mode when the image transmission is completed.

In the camera 20, by loading a predetermined program, the control unit cooperates with the communication unit to implement a camera setting reception module, a sensing result acquisition module, and an inspection data transmission module.

Furthermore, in the camera 20, by loading a predetermined program, the control unit cooperates with the memory unit to implement a camera setting memory module, an imaging condition instruction memory module, a recording condition instruction memory module, and a trimming condition instruction memory module.

Furthermore, in the camera 20, by loading a predetermined program, the control unit cooperates with the processing unit to implement an imaging condition instruction generation module, a recording condition instruction generation module, a trimming condition instruction generation module, a check module, a condition instruction existence check module, an imaging condition change module, an imaging module, a recording condition change module, a recording module, a trimming condition change module, a trimming module, and a communication mode switching module.

Camera Setting Process Executed by Inspection Terminal 10

The camera setting process executed by the inspection terminal 10 is described below with reference to FIG. 3. FIG. 3 shows a flowchart of the camera setting process executed by the inspection terminal 10. The processes executed by each of the modules described above are explained below with this camera setting process. The camera setting process is implemented by a predetermined application causing each module to execute processes.

The imaging schedule setting module sets an imaging schedule for capturing an image of an inspection target 3 (Step S10). The imaging schedule refers to a timing at which the camera 20 captures an image of an inspection target 3. The imaging schedule is the number of times and the time at which an image is captured in a day. The imaging schedule, as described above, shows, for example, once at a predetermined time in a day, multiple frequencies at multiple predetermined times in a day, every hour, etc.

The imaging schedule setting module receives input of the number of frequencies and a time. The method for receiving input includes, for example, having an inspection worker select a desired schedule from multiple imaging schedules or directly input the number of desired times and a desired time.

The imaging schedule setting module sets an imaging schedule based on the number of times and the time that have been received.

The recording schedule setting module sets a recording schedule for recording a sound around the inspection target 3 (Step S11). The recording schedule refers to a timing at which the camera 20 records a sound around the inspection target 3 (camera 20). The recording schedule is the timing of the imaging schedule, which is a predetermined time interval before and after the camera 20 captures an image.

The recording schedule spans the time interval from a specified time before the camera 20 captures an image to a specified time after the imaging. The recording schedule is set to 1 second, 5 seconds, 10 seconds, etc., before and after the imaging. For example, in the case of 1 second before and after the imaging, the time interval is from 1 second before the camera 20 captures an image to 1 second after the imaging. For example, the interval may be only before the imaging, such as from 20 seconds to 5 seconds before the imaging or, conversely, may be an interval only after the imaging. In other words, the recording schedule may include an interval before and after the imaging, only before or after the imaging.

The recording schedule setting module receives input of the time. The method for receiving input includes, for example, having an inspection worker select a desired schedule from multiple recording schedules or directly input a desired time.

The recording schedule setting module sets a recording schedule based on the time received.

By recording a sound around the inspection target 3, it becomes easier to make a confirmation even if an inspection worker is unable to make a confirmation solely based on the image.

The resolution setting module sets the resolution of an image of an inspection target 3 (Step S12). For example, the resolution refers to specifying the quality of an image, such as low quality, high quality, or standard quality.

The resolution setting module receives input of the resolution. The method for receiving input includes, for example, having an inspection worker select a desired resolution from multiple resolutions or directly input a desired resolution.

The resolution setting module sets a resolution of the camera 20 based on the received resolution of the camera 20.

The camera setting module sets the settings of the camera 20 that captures an image of an inspection target 3 (Step S13). The settings of the camera 20, for example, include flash-enabled or disabled, flash intensity, automatic light emitting-enabled or disabled, EV in an ordinary condition, EV under a lower illumination level, and shutter speed.

The camera setting module receives input of the settings. The method for receiving input includes, for example, using a previously set initial value as is, having an inspection worker select a desired setting from multiple settings, or directly input a desired setting.

The camera setting module sets a setting of the camera 20 based on the received setting of the camera 20.

The communication mode setting module sets the standby communication mode and the transmission communication mode (Step S14). The standby communication mode refers to the communication mode used while an image is not being transmitted. The transmission communication mode refers to the communication mode used while an image is being transmitted. The standby communication mode consumes less current than the transmission communication mode, with an average consumption current of 1 mA or less per hour. The transmission communication mode has an average consumption current more than 1 mA per hour, which needs at least a necessary current consumption to transmit an image trimmed by the camera 20.

The communication mode setting module receives input for the standby communication mode and the transmission communication mode. The method for receiving input includes, for example, using a previously set initial consumption current, having an inspection worker select a desired combination from the combinations of the standby communication modes and the transmission communication modes with the respective initial consumption currents previously set, having an inspection worker select a desired consumption current from multiple consumption currents or directly input a desired consumption current. The selected combination can be changed.

The communication mode setting module sets the standby communication mode and the transmission communication mode based on the standby communication mode and the transmission communication mode that have been received.

By keeping the current consumption of the standby communication mode below 1 mA, the effect of power saving becomes higher.

Setting Screen

Figure 4:
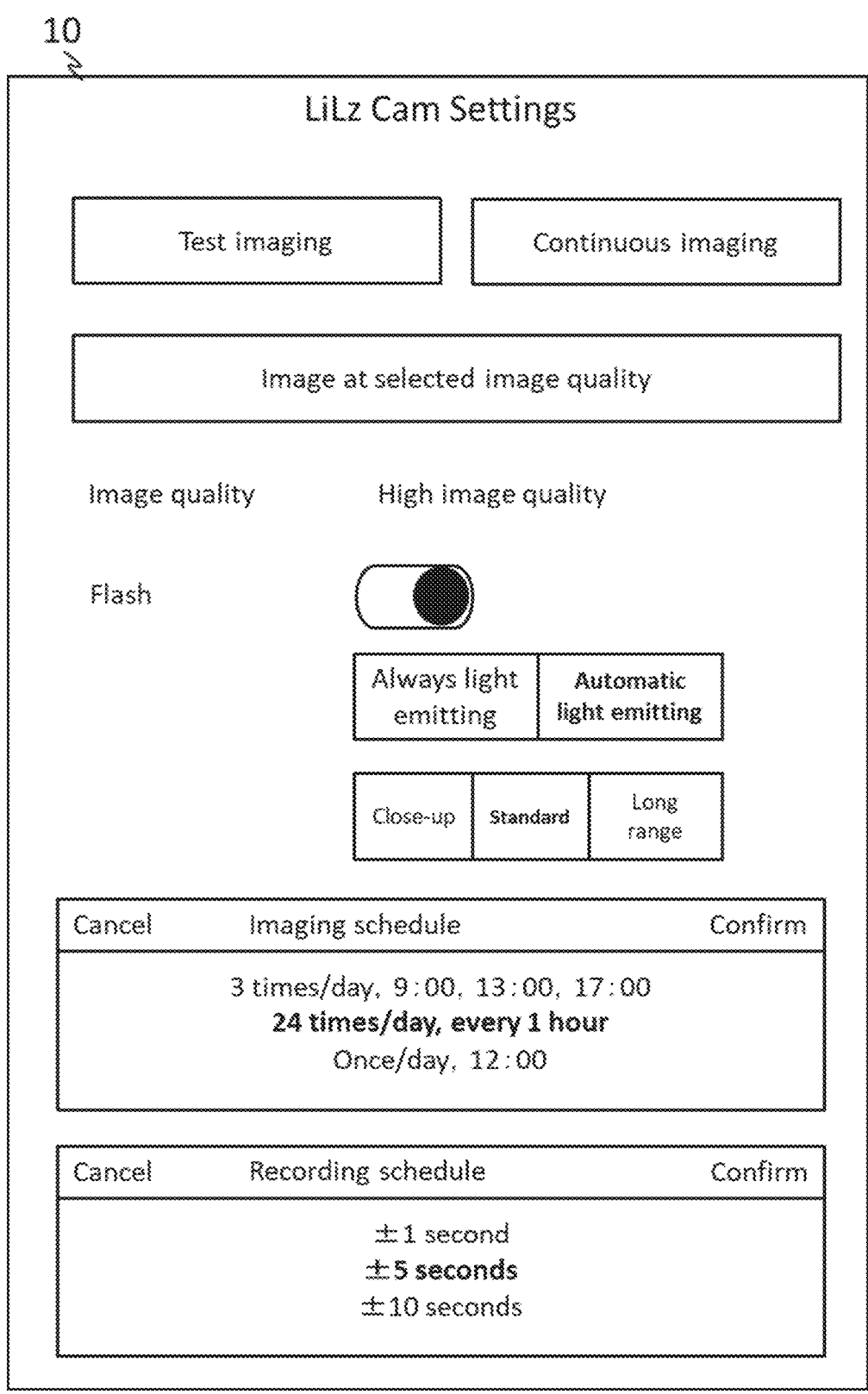
FIG. 4 is a diagram schematically showing an example of settings set by an inspection terminal 10.

The settings set by the process of the above-mentioned Steps S10-S14 are described below with reference to FIG. 4. FIG. 4 is a diagram schematically showing an example of settings set by the inspection terminal 10. FIG. 4 shows the settings of image quality, flash-enabled or disabled, automatic light emitting-enabled or disabled for flash, flash intensity, imaging schedule, and recording schedule. The description of other set settings is omitted.

In FIG. 4, the inspection terminal 10, as a result of the above-mentioned process of Steps S10-S14, is set with a high image quality, flash enabled, automatic light emission enabled for flash, standard flash intensity, an imaging schedule of 24 times per day (once every hour), and a recording schedule set to ±5 seconds from the time of imaging.

Returning to FIG. 3, the camera setting process is continued to be explained below.

The trimming setting module sets the area to be trimmed of an image of an inspection target 3 (Step S15). The term "trimming" herein means to cut out only a specified area, delete all the other areas as unnecessary, and generate an image of only the specified area.

Figure 5:
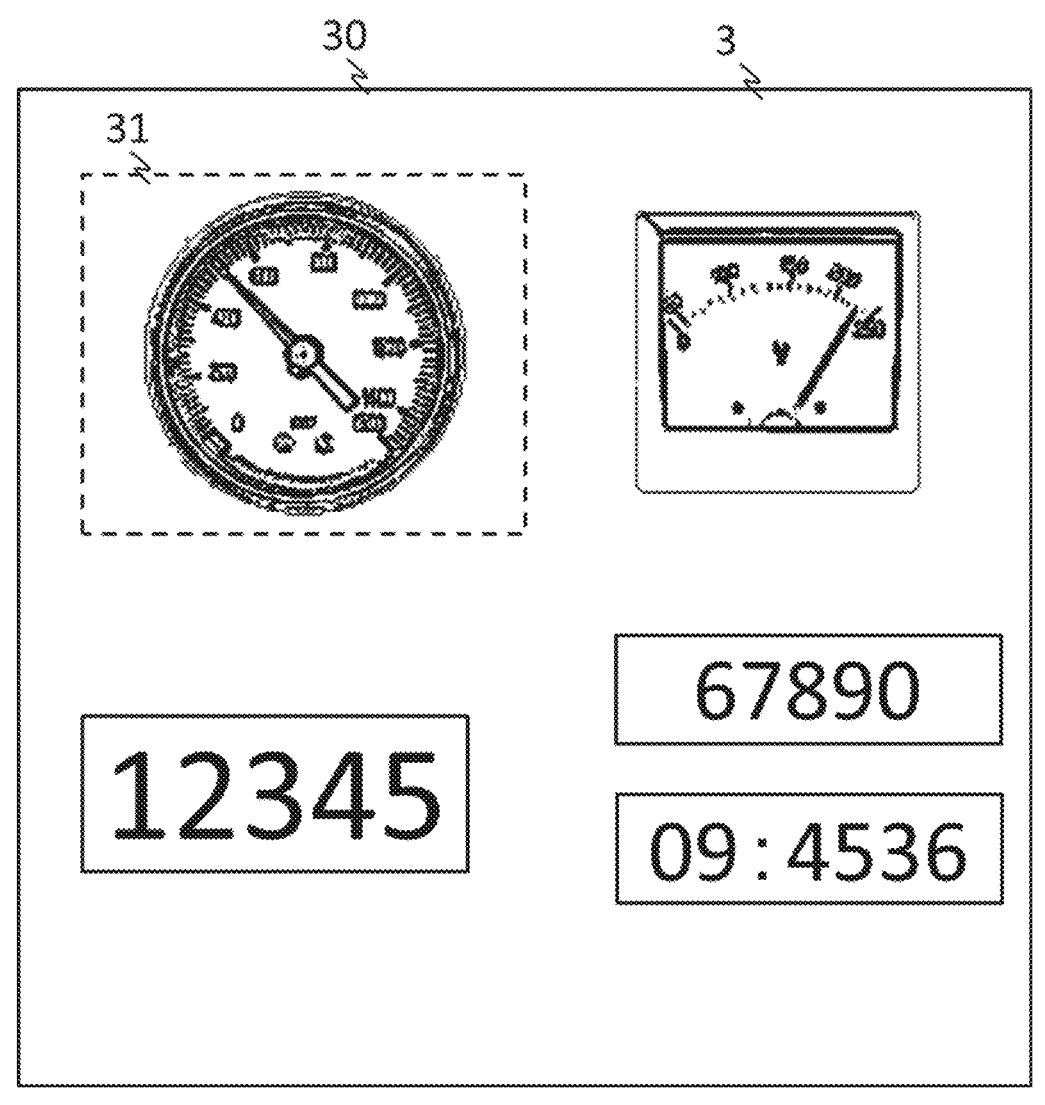
FIG. 5 is a diagram schematically showing an example image of an inspection target 3.

The test image acquisition module acquires an image of an inspection target 3 that was previously captured by the camera 20. The image acquired by the test image acquisition module at this time is captured by the camera 20 when it is placed, or at another timing. The trimming setting module sets an area 31 to be trimmed of the image 30 of an inspection target 3, as an example of which is shown in FIG. 5

The trimming setting module receives input by a tap operation, etc., to the image 30 displayed on the display unit, etc. The trimming setting module receives input of an area 31 to be trimmed by receiving input by encompassing a desired area of the inspection target 3 with a rectangle, a circle, etc., or specifying a desired area of the inspection target 3 from an inspection worker. The trimming setting module sets the area 31 to be trimmed, which is specified by the input, as the area 31 to be trimmed of the image 30. The area 31 to be trimmed set here is established as a coordinate within the image 30 or as a position within the image 30. In the inspection data transmission process to be described later, an image 40 (refer to FIG. 11 to be described later) captured by the camera 20 and an image 30 setting an area 31 to be trimmed this time are considered to contain an inspection target 3 in a fixed location in the image 30, 40 if the location of the camera 20 is fixed. This is because the inspection target 3 is imaged in the same location in the images 30, 40.

In this Embodiment, only one area 31 to be trimmed is set; however, multiple areas to be trimmed may be set. When multiple trimming areas are set, each of the set areas to be trimmed is to be trimmed out, and the image of each specified area is to be generated accordingly.

The camera setting transmission module transmits the camera settings to the camera 20 (Step S16).

The camera setting transmission module transmits the imaging schedule, the recording schedule, the resolution, the settings of the camera 20, the standby communication mode, the transmission communication mode, and the area to be trimmed that have been set by the processes of Steps S10-15 described above as the camera settings to the camera 20. The camera setting reception module receives the camera settings. The camera setting memory module memorizes the camera settings. Accordingly, the camera 20 has its own settings set by memorizing this camera settings.

The camera 20 executes the imaging process (and the recording process if a recording condition instruction exists) and the inspection data transmission process to be described later based on the memorized camera settings, the imaging condition instruction (and the recording condition instruction if it exists), and the trimming condition instruction to be described later.

Then, the camera 20 switches back from the transmission communication mode to the standby communication mode when the image transmission is completed. Since the standby communication mode consumes less current than the transmission communication mode, the standby communication mode saves more power, compared with being standby in the transmission communication mode.

First Instruction Generation Process Executed by Inspection Terminal 10

The first instruction generation process executed by the inspection terminal 10 is described below with reference to FIG. 6. FIG. 6 shows a flowchart of the first instruction generation process executed by the inspection terminal 10. The processes executed by each of the modules described above are explained below with this first instruction generation process.

This first instruction generation process relates to the periodical check process for checking whether or not there exists an imaging condition instruction (Step S1) described above, which is performed after the above-mentioned camera setting process.

The imaging condition input reception module receives input of an imaging condition of the camera 20 (Step S20).

The imaging condition relates to imaging, for example, imaging schedule, imaging timing, imaging frequency, imaging duration, imaging range, and also relates to the settings of the camera 20, such as resolution, flash-enabled or disabled, flash intensity, automatic light emitting-enabled or disabled, EV, and shutter speed.

The imaging condition input reception module receives input of an imaging condition. At this time, the imaging condition input reception module may receive input of all or some items of the above-mentioned imaging condition. The method for receiving input includes, for example, having an inspection worker select a desired imaging condition or directly input a desired imaging condition.

The imaging condition may include other items, not limited to the examples described above.

The imaging condition instruction generation module generates an imaging condition instruction based on the received imaging condition of the camera 20 (Step S21).

The imaging condition instruction is for providing the imaging condition to the camera 20.

The imaging condition instruction generation module generates an imaging condition instruction in a predetermined format based on the received imaging condition.

The imaging condition instruction transmission module transmits the generated imaging condition instruction to a cloud computer (Step S22).

The imaging condition instruction transmission module transmits the imaging condition instruction to a cloud computer, and the cloud computer receives this imaging condition instruction.

The cloud computer stores the imaging condition instruction in the storage location previously set. The storage location, as described above, is a physical or virtual location. The cloud computer stores the imaging condition instruction in the storage location by, for example, memorizing the received imaging condition instruction in the memory unit, etc.

The recording condition input reception module receives input of a recording condition of the camera 20 (Step S23).

The recording condition relates to recording, such as a recording schedule, a recording time, a recording timing, etc.

The recording condition input reception module receives input of a recording condition. At this time, the recording condition input reception module may receive input of all or some items of the above-mentioned recording condition. The method for receiving input includes, for example, having an inspection worker select a desired recording condition or directly input a desired recording condition.

The imaging condition may include other items, not limited to the examples described above.

The recording condition instruction generation module generates a recording condition instruction based on the received recording condition of the camera 20 (Step S24).

The recording condition instruction is for providing the recording condition to the camera 20.

The recording condition instruction generation module generates a recording condition instruction in a predetermined format based on the received recording condition.

The recording condition instruction transmission module transmits the generated recording condition instruction to a cloud computer (Step S25).

The recording condition instruction transmission module transmits the recording condition instruction to a cloud computer, and the cloud computer receives this recording condition instruction.

The cloud computer stores the recording condition instruction in the storage location previously set. The storage location, as described above, is a physical or virtual location. The cloud computer stores the recording condition instruction in the storage location by, for example, memorizing the received recording condition instruction in the memory unit, etc.

The trimming condition input reception module receives input of a trimming condition of the camera 20 (Step S26).

The trimming condition, as described above, relates to an area to be trimmed from the image of the inspection target 3, which has been captured by the camera 20.

The trimming condition input reception module receives input of a trimming condition. The method for receiving input only has to be similar to the method for input of an area 31 to be trimmed, which is received by the trimming setting module in the process of the above-mentioned Step S15.

The trimming condition instruction generation module generates a trimming condition instruction based on the received trimming condition of the camera 20 (Step S27).

The trimming condition instruction is for providing the trimming condition to the camera 20.

The trimming condition instruction generation module generates a trimming condition instruction in a predetermined format based on the trimming condition.

The trimming condition instruction transmission module transmits the generated trimming condition instruction to a cloud computer (Step S28).

The trimming condition instruction transmission module transmits the trimming condition instruction to a cloud computer, and the cloud computer receives this trimming condition instruction.

The cloud computer stores the trimming condition instruction in the storage location previously set. The storage location, as described above, is a physical or virtual location. The cloud computer stores the trimming condition instruction in the storage location by, for example, memorizing the received trimming condition instruction in the memory unit, etc.

The inspection terminal 10 does not necessarily have to perform all the processes of the above-mentioned Steps S20-S28. At a minimum, the inspection terminal 10 only has to be configured to perform processes related to an imaging condition (Steps S20-S22) and a trimming condition (Steps S26-S28). The inspection terminal 10 may be configured to simultaneously receive input of an imaging condition, a recording condition, and a trimming condition. In this case, the inspection terminal 10 only has to transmit an imaging condition instruction, a recording condition instruction, and a trimming condition instruction, which have been generated, together to a cloud computer.

The second instruction generation process executed by the camera 20 is described below with reference to FIG. 7. FIG. 7 shows a flowchart of the second instruction generation process executed by the camera 20. The processes executed by each of the modules described above are explained below with this second instruction generation process.

This second instruction generation process relates to the periodical check process for checking whether or not there exists an imaging condition instruction (Step S1) described above, which is performed after the above-mentioned camera setting process. Furthermore, any one or both of the above-mentioned first instruction generation process and this second instruction generation process may be performed.

The sensing result acquisition module acquires a sensing result from a sensor attached to the camera 20 (Step S30).

The sensor attached to the camera 20, as described above, is a pressure sensor, an infrared sensor, etc. The sensing result, as described above, is detection of a pressed imaging button, a moving object, for example.

The sensor transmits a sensing result detected by itself to the camera 20. The sensing result acquisition module acquires a sensing result by receiving the sensing result.

The type of sensor and the sensing result are not limited to the examples described above and can be appropriately changed.

The imaging condition instruction generation module generates an imaging condition instruction based on the acquired sensing condition (Step S31).

The imaging condition instruction generation module generates an imaging condition instruction in a predetermined format based on the acquired sensing condition.

The imaging condition instruction memory module stores the generated imaging condition instruction in a storage location previously set within the camera 20 itself (Step S32).

The storage location, similar to the storage location described above in the cloud computer, is a physical or virtual location.

The imaging condition instruction memory module stores the imaging condition instruction in the storage location by, for example, memorizing the generated imaging condition instruction in the memory unit, etc.

The recording condition instruction generation module generates a recording condition instruction based on the acquired sensing condition (Step S33).

The recording condition instruction generation module generates a recording condition instruction in a predetermined format based on the acquired sensing condition.

The recording condition instruction memory module stores the generated recording condition instruction in a storage location previously set within the camera 20 itself (Step S34).

The storage location, similar to the storage location described above in the cloud computer, is a physical or virtual location.

The recording condition instruction memory module stores the recording condition instruction in the storage location by, for example, memorizing the generated recording condition instruction in the memory unit, etc.

The trimming condition instruction generation module generates a trimming condition instruction based on the acquired sensing condition (Step S35).

The trimming condition instruction generation module generates a trimming condition instruction in a predetermined format based on the acquired sensing condition.

The trimming condition instruction memory module stores the generated trimming condition instruction in a storage location previously set within the camera 20 itself (Step S36).

The storage location, similar to the storage location described above in the cloud computer, is a physical or virtual location.

The trimming condition instruction memory module stores the imaging condition instruction in the storage location by, for example, memorizing the generated trimming condition instruction in the memory unit, etc.

The camera 20 does not necessarily have to perform all the processes of the above-mentioned Steps S30-S36. At a minimum, the camera 20 only has to be configured to perform the sensing result acquisition process (Step S30), processes related to an imaging condition (Steps S31, S32) and a trimming condition (Steps S35, S36). The camera 20 may be configured to simultaneously generate an imaging condition instruction, a recording condition instruction, and a trimming condition instruction. In this case, the camera 20 only has to store an imaging condition instruction, a recording condition instruction, and a trimming condition instruction, which have been generated, together in the storage location.

Imaging Process Executed by Camera 20

The imaging process executed by the camera 20 is described below with reference to FIG. 8. FIG. 8 shows a flowchart of the imaging process executed by the camera 20. The processes executed by each of the modules described above are explained below with this imaging process. This imaging process is a detail of the check process for checking whether or not there exist an imaging condition instruction (Step S1) described above and the imaging process for an image of an inspection target 3 (Step S2), which is performed after the above-mentioned first and second instruction generation processes.

The check module periodically checks whether or not there exist an imaging condition instruction and a trimming condition instruction in storage locations for the respective instructions (Step S40).

The check module periodically checks an imaging condition instruction stored at the storage location of the cloud computer by the above-mentioned first instruction generation process or of the camera 20 by the above-mentioned second instruction generation process.

The check module also periodically checks a trimming condition instruction stored at the storage location of the cloud computer by the above-mentioned first instruction generation process or of the camera 20 by the above-mentioned second instruction generation process.

The check module accesses the cloud computer and checks an imaging condition instruction and a trimming condition instruction stored in the respective storage locations of this cloud computer. Alternatively, the check module checks an imaging condition instruction stored in the storage location of the camera 20.

The condition instruction existence check module checks whether or not there exist an imaging condition instruction and a trimming condition instruction in the respective storage locations checked (Step S41).

If the condition instruction existence check module does not find an imaging condition instruction or a trimming condition instruction existing in the corresponding storage location checked (Step S41 NO), the imaging condition check module executes the above-mentioned process of checking an imaging condition instruction again (Step S40).

On the other hand, if the condition instruction existence check module finds an imaging condition instruction and a trimming condition instruction existing in the respective storage locations checked (Step S41 YES), the imaging condition change module changes the imaging condition of the camera 20 based on the existing imaging condition instruction (Step S42).

For example, if changing the resolution, the imaging condition change module changes the resolution (image quality) to capture an image. The imaging condition change module may be configured to change the resolution of the captured image. In this case, the imaging condition change module changes the resolution by rescaling the image, changing the dpi (dots per inch), or compressing the image, for example.

The imaging condition change module also changes other imaging conditions to capture an image or after an image is captured.

The imaging condition change changes the camera settings set in the camera 20 by the above-mentioned camera setting process, based on the condition related to imaging and settings of the camera 20 contained in the imaging condition instruction. At this time, the imaging condition change module maintains the camera settings set in the camera 20 by the above-mentioned camera setting process for any conditions not contained in the imaging condition instruction.

The camera setting memory module memorizes the camera settings after the change (Step S43).

The camera setting memory module overwrites the imaging condition before the change with the checked imaging condition.

The imaging module captures an image of an inspection target 3 (Step S44).

The imaging module captures an image based on the condition set in the camera settings after the change.

The configuration in which the imaging module performs imaging only has to be configured to capture an image by a device with a general imaging function.

The computer 10 checks the imaging condition instruction again. If the imaging condition has been changed, the computer 10 overwrites the imaging condition previously used with the imaging condition newly checked and changes the camera settings.

Furthermore, if the imaging condition instruction contains a periodical imaging schedule, the imaging condition change module can be configured to change the imaging condition in the camera settings to this periodical imaging schedule, and the imaging module can be configured to capture an image of an inspection target 3 based on this periodical imaging schedule. At this time, regardless of the imaging condition instruction existence check process (Step S41), the computer 10 captures an image of an inspection target 3 at the date and time of the timing of the imaging schedule based on the camera settings after the change. At this time, the camera 20 can be configured to record a sound around the inspection target 3 based on the recording schedule in the camera settings, in accordance with the periodical imaging schedule.

Recording Process Executed by Camera 20

Figure 9:
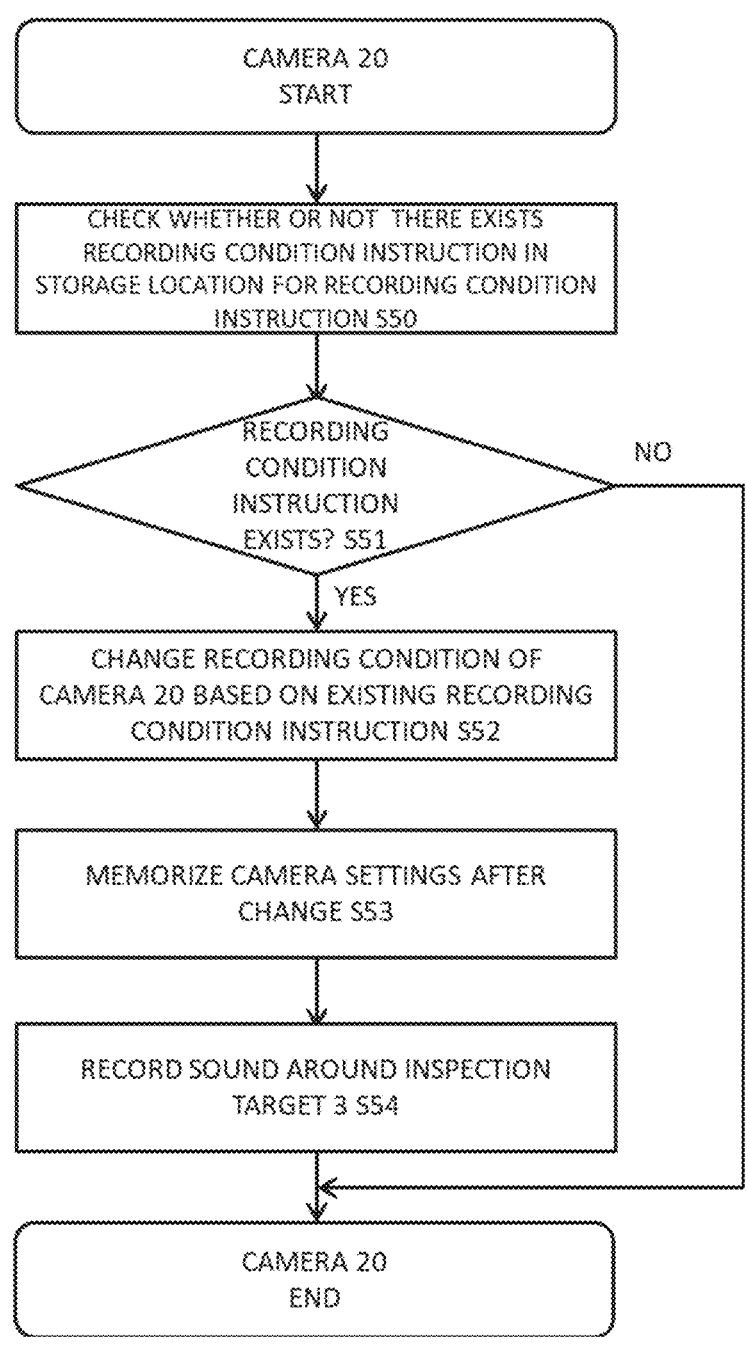
FIG. 9 shows the recording process executed by the inspection-target-image transmission system 1.

The recording process executed by the camera 20 is described below with reference to FIG. 9. FIG. 9 shows a flowchart of the recording process executed by the camera 20. The processes executed by each of the modules described above are explained below with this recording process. This recording process relates to the above-mentioned imaging process, which is performed simultaneously with or after the above-mentioned imaging process.

The check module checks whether or not there exists a recording condition instruction in a storage location for a recording condition instruction (Step S50).

The check module periodically checks a recording condition instruction stored at the storage location of the cloud computer by the above-mentioned first instruction generation process or of the camera 20 by the above-mentioned second instruction generation process.

The check module accesses the cloud computer and checks a recording condition instruction stored in the storage location of this cloud computer. Alternatively, the check module checks a recording condition instruction stored in the storage location of the camera 20.

The condition instruction existence check module checks whether or not there exists a recording condition instruction in the checked storage location (Step S51).

If the condition instruction existence check module does not find a recording condition instruction existing in the checked storage location (Step S51 NO), the computer 10 ends the recording process.

On the other hand, if the condition instruction existence check module finds a recording condition instruction existing in the checked storage location (Step S51 YES), the recording condition change module changes the recording condition of the camera 20 based on the checked recording condition instruction (Step S52).

The recording condition change module changes the camera settings set in the camera 20 by the above-mentioned camera setting process based on the condition related to recording, which is contained in the recording condition instruction. At this time, the recording condition change module maintains the camera settings set in the camera 20 by the above-mentioned camera setting process for any conditions not contained in the recording condition instruction.

The camera setting memory module memorizes the camera settings after the change (Step S53).

The camera setting memory module overwrites the recording condition before the change with the checked recording condition.

The recording module records a sound around the inspection target 3 (Step S54).

The recording module records a sound based on the condition in the camera settings after the change.

The configuration in which the recording module performs recording only has to record a sound by a device with a general recording function.

The computer 10 checks the recording condition instruction again. If the recording condition has been changed, the computer 10 overwrites the previously used recording condition with the newly checked recording condition and changes the camera settings.

The above-mentioned imaging process and recording process are a series of processes, and the computer 10 executes the recording process either during or after the execution of the imaging process. In the process of checking whether or not there exists a recording condition instruction (Step S51) in the above-mentioned recording process, if the computer 10 could not find a recording condition instruction (Step S51 NO), it performs a process that is configured to exclude a sound around the inspection target 3 in the subsequent inspection data transmission process. If the computer 10 could find a recording condition instruction (Step S51 YES), it performs a process that is configured to include the sound.

Furthermore, if the recording condition instruction contains a periodical recording schedule, the recording condition change module can be configured to change the recording condition in the camera settings to this periodical imaging schedule, and the recording module can be configured to record a sound around the inspection target 3 based on this periodical recording schedule. At this time, regardless of the recording condition instruction existence check process (Step S51), the computer 10 records a sound around the inspection target 3 at the timing of the recording schedule based on the camera settings after the change. In other words, if the above-mentioned imaging process changes the imaging condition to a periodical imaging schedule and if the recording process changes the recording condition to a periodical recording schedule in this recording process, the camera 20 captures an images of an inspection target 3 and records a sound around the inspection target 3 based on these conditions.

Inspection Data Transmission Process Executed by Camera 20

The inspection data transmission process executed by the camera 20 is described below with reference to FIG. 10. FIG. 10 shows a flowchart of the inspection data transmission process executed by the camera 20. The processes executed by each of the modules described above are explained below with this inspection data transmission process. This inspection data transmission process is a detail of the image trimming process (Step S3), the image transmission process (Step S4), and the standby process (Step S5), which is performed after the above-mentioned imaging process and recording process.

This inspection data transmission process is explained below in the case, as an example, where both an image captured by the imaging process and a sound recorded by the recording process are used.

The trimming condition change module changes the trimming condition of the camera 20 based on the existing trimming condition instruction (Step S60).

For example, if the trimming condition has been changed to enlarge an area to be trimmed, the trimming condition change module enlarges the area to be trimmed in the captured image. Furthermore, if the trimming condition has been changed in other way to, for example, reduce, change, or add an area to be trimmed, the trimming condition change module reduces, changes, or adds an area to be trimmed, as well.

The trimming condition change module changes the camera settings set in the camera 20 by the above-mentioned camera setting process. At this time, the trimming condition change module maintains the camera settings set in the camera 20 by the above-mentioned camera setting process for any conditions not contained in the trimming condition instruction.

The camera setting memory module memorizes the camera settings after the change (Step S61).

The camera setting memory module overwrites the trimming condition before the change with the checked trimming condition.

The trimming module trims the captured image based on the existing trimming condition instruction (Step S62).

Figure 11:
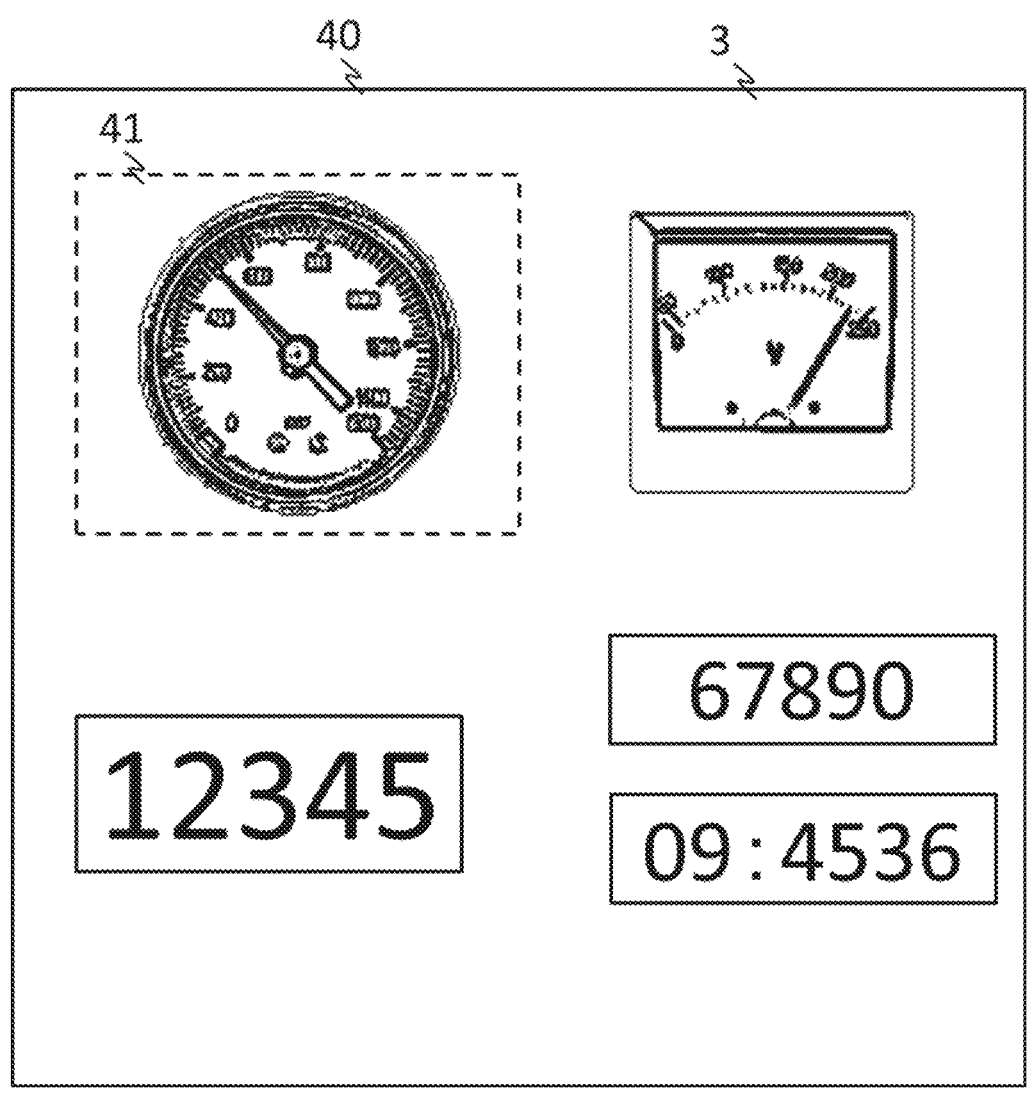
FIG. 11 is a diagram schematically showing an example of how to trim an image 40 captured by the camera 20.
Figure 12:
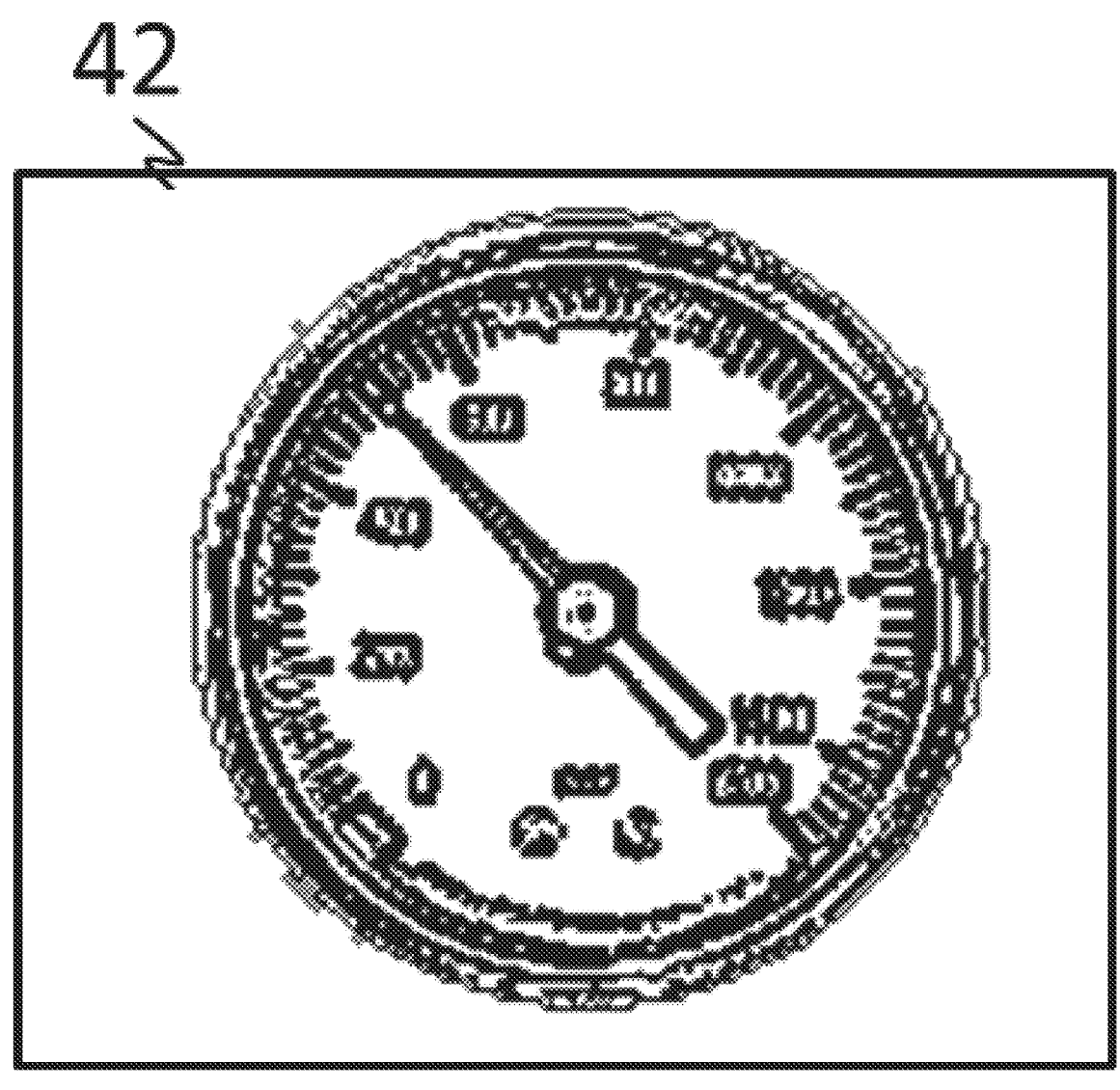
FIG. 12 is a diagram schematically showing an example trimmed image 42 that the camera 20 transmits to an inspection terminal 10.

The trimming module determines an area 41 to be trimmed in the captured image 40 based on the existing trimming condition instruction as shown in FIG. 11. The trimming module determines the same location of the existing trimming condition instruction as an area 41 to be trimmed in the captured image 40. The trimming module trims the determined area 41 to be trimmed. The trimming module deletes an area outside of the area 41 to be trimmed of the image 40 as unnecessary areas. The trimming module generates a trimmed image 42, which includes only the area 41 to be trimmed, by trimming the image 40 (refer to FIG. 12).

If multiple areas to be trimmed have been set, the trimming module trims each of the areas to be trimmed. The trimming module deletes areas outside of the areas 41 to be trimmed of the image 40 as unnecessary areas. The trimming module generates an image of each trimmed area. In other words, if multiple areas to be trimmed have been set, the trimming module generates the same number of images as that of the set areas to be trimmed.

The communication mode switching module switches from the standby communication mode to the transmission communication mode (Step S63).

In the standby communication mode, the average consumption current per hour is 1 mA or less. In the transmission communication mode, the average consumption current per hour is more than 1 mA.

The communication mode switching module switches from the standby communication mode to the transmission communication mode based on the communication mode in the camera settings. Switching from the standby communication mode to the transmission communication mode causes the camera 20 to increase power consumption, which enables the camera 20 to transmit the trimmed image 42 to the inspection terminal 10.

Then, the camera 20 switches back from the transmission communication mode to the standby communication mode when the image transmission is completed. Since the standby communication mode consumes less current than the transmission communication mode, the standby communication mode saves more power, compared with being standby in the transmission communication mode.

The inspection data transmission module transmits the trimmed image 42, the recorded sound, the setting information, and the status information to the inspection terminal 10 as inspection data (Step S64).

The setting information relates to camera settings such as an area to be trimmed, firmware version, exposure adjustment value, flash intensity, or resolution. The status information relates to the status of the camera 20 itself, such as battery level, signal strength, or error logs.

The inspection data transmission module transmits inspection data associated with the trimmed image 42, the recorded sound, the setting information, and the status information to the inspection terminal 10.

The inspection data reception module receives the inspection data. The inspection data display module displays the inspection data. By viewing the inspection data, an inspection worker is able to conduct a remote inspection.

The communication mode switching module switches back from the transmission communication mode to the standby communication mode (Step S65).

The communication mode switching module switches back from the transmission communication mode to the standby communication mode based on the communication mode in the camera settings. Switching back from the transmission communication mode to the standby communication mode causes the camera 20 to decrease power consumption, which enables power saving.

Then, the camera 20 switches back from the transmission communication mode to the standby communication mode when the image transmission is completed. Since the standby communication mode consumes less current than the transmission communication mode, the standby communication mode saves more power, compared with being standby in the transmission communication mode.

The computer 10 checks the trimming condition instruction again. If the trimming condition has been changed, the computer 10 overwrites the previously used trimming condition with the newly checked trimming condition and changes the camera settings.

The inspection-target-image transmission system 1 can also change the camera settings set by the above-mentioned camera setting process based on a result of the inspection data transmission process described above. The inspection terminal 10 changes the previously set camera settings by executing the above-mentioned camera setting process again. The inspection terminal 10 changes the camera settings upon receiving input of change of the settings from an inspection worker.

Regardless of a result of the above-mentioned inspection data transmission process, the inspection-target-image transmission system 1 can change the set camera settings.

For example, if changing the set imaging schedule, the inspection terminal 10 changes the imaging schedule by executing the imaging schedule setting process (Step S10) described above again. To save power more, the intervals scheduled for imaging are extended. To increase the frequency of confirming the status of an inspection target 3, the intervals scheduled for imaging are shortened. To decrease the frequency of confirming the status of an inspection target 3, the intervals scheduled for imaging are extended.

Furthermore, if changing the set recording schedule, the inspection terminal 10 changes the recording schedule by executing the recording schedule setting process (Step S11) described above again. To save power more, the intervals scheduled for recording are extended. Furthermore, if changing the set resolution, the inspection terminal 10 changes the resolution by executing the resolution setting process (Step S12) described above again. If the image quality needs to be improved, the resolution is changed to a higher setting. Conversely, if a lower image quality is acceptable or if the power needs to be saved, the resolution is changed to a lower setting.

Furthermore, if changing the set settings of the camera 20, the inspection terminal 10 changes the settings by executing the setting process for the settings of the camera 20 (Step S13) described above again. In accordance with the condition of the transmitted image, the inspection terminal 10 changes flash-enabled or disabled, flash intensity, automatic light emission-enabled or disabled, EV in an ordinary condition, EV under a lower illumination level, shutter speed, etc.

Furthermore, if changing the set communication mode, the inspection terminal 10 changes the communication mode by executing the setting process for the standby communication mode and the transmission communication mode (Step S14) described above again. At this time, the inspection terminal 10 may change any one or the combinations of the standby communication modes and the transmission communication modes. To save power more, the combination of the communication modes is changed to that consumes the least amount of current. To transmit a clearer image, the current for the transmission communication mode is increased.

Furthermore, if changing the set area to be trimmed, the inspection terminal 10 changes the settings by executing the setting process for the area to be trimmed (Step S15) described above again. To save power more, the area to be trimmed is changed to reduce its size for decreasing the image size. To confirm the status farther from an inspection target 3, the area to be trimmed is changed to increase its size.

In the embodiment described above, the inspection target 3 is described as a meter, but the present disclosure can be applied even if the inspection target 3 is a container, streetlight, river, animal trap, etc.

The inspection-target-image transmission system 1 executes the inspection data transmission process described above and transmits an image of an inspection target 3 to have an inspection worker confirm the status of the inspection target 3 based on this image. If the inspection target 3 is a container, an inspection worker confirms whether or not the container is full. If the inspection target 3 is a streetlight, an inspection worker confirms whether or not the streetlight is out. If the inspection target 3 is a river, an inspection worker confirms the level of the water. If the inspection target 3 is a trap, an inspection worker confirms whether or not an animal has been captured in the trap. In other cases of inspection targets 3, an inspection worker confirms whether or not the inspection target 3 has an abnormality.

The computer (including CPU, an information processor, and various terminals) reads and executes a predetermined program to achieve the above-mentioned means and functions. For example, the program may be provided by a computer (SaaS: Software as a Service) through a network or a cloud service. The program may be provided in a form recorded in a computer-readable recording medium, for example. In this case, the computer reads a program from the recording medium, and forwards it to an internal or external storage, records it in the storage, and executes it. The program may be previously recorded in a storage (recording medium) and provided from the storage to the computer through a communication line.

Embodiments of the present disclosure are described above, but the present disclosure is not limited thereto. Moreover, the effects described in Embodiments of the present disclosure are only the most suitable ones produced from the present disclosure. The effects of the present disclosure are not limited to those described in Embodiments of the present disclosure. For example, the camera 20 may be provided with the imaging schedule setting module, the recording schedule setting module, the trimming setting unit 11, the resolution setting module, the camera setting module, the communication mode setting module, and the trimming setting module instead of the inspection terminal 10.

(1) An inspection-target-image transmission system that transmits an image of an inspection target (e.g. meter, container, streetlight, river, animal trap), the image having been captured by a camera (e.g. camera 20), including:

a check unit (e.g. check unit 21, check module) that has the camera periodically check whether or not there exist an imaging condition instruction and a trimming condition instruction in storage locations for the respective instructions;

an imaging unit (e.g. imaging unit 23, imaging condition change module, imaging module) that has the camera change the imaging condition (e.g. imaging schedule, imaging timing, imaging frequency, imaging duration, imaging range, resolution, flash-enabled or disabled, flash intensity, automatic light emitting-enabled or disabled, EV, shutter speed) and capture an image of an inspection target based on the existing imaging condition instruction;

a trimming unit (e.g. trimming unit 24, trimming condition change module, trimming module) that has the camera change the trimming condition and trim the image of the inspection target, the image having been captured by the camera, based on the existing trimming condition instruction;

a transmission unit (e.g. transmission unit 22, communication mode switch module, inspection data transmission module) that has the camera switch from a standby communication mode to a transmission communication mode and transmit the trimmed image of the inspection target; and a standby unit (e.g. standby unit 25, communication mode switching module) that has the camera switch back from the transmission communication mode to the standby communication mode when the image transmission is completed.

The disclosure of (1) enables remote inspection with power saving and achieves power saving by improving inspection efficiency.

(2) The inspection-target-image transmission system according to (1), in which the check module has the camera periodically check whether or not there exists a recording condition instruction in the storage location;

the imaging unit has the camera change the recording condition and record a sound around the inspection target based on the checked recording condition instruction; and the transmission unit has the camera transmit the recorded sound around the inspection target.

The disclosure of (2) enables inspection not only through an image but also a sound around the inspection target. Even if an inspection worker and a manager are unable to confirm the status of an inspection target by an image alone, they easily confirm the status of the inspection target through the surrounding sound.

(3) The inspection-target-image transmission system according to (1), in which, in the standby communication mode, the average consumption current per hour is 1 mA or less.

According to the disclosure of (3), the effect of power saving becomes higher by keeping the current consumption of the standby communication mode below 1 mA.

(4) The inspection-target-image transmission system according to (1), in which the trimming setting unit sets resolution of an image of the inspection target; and the trimming unit trims the image of the inspection target at the set resolution.

The disclosure of (4) makes it possible to reduce power consumption during transmission by setting a necessary resolution.

(5) The inspection-target-image transmission system according to (1), in which the check unit has the camera check whether or not there exists a trimming condition instruction in the storage location;

the imaging unit overwrites the imaging condition previously used with the imaging condition newly checked and captures an image of the inspection target; and the trimming unit overwrites the previously used trimming condition with the newly checked trimming condition and trims the image of the inspection target.

The disclosure of (5) enables transmission of an image based on an optimum imaging condition and trimming condition.

(6) The inspection-target-image transmission system according to (1), further including an imaging schedule change unit that changes the imaging condition to a periodical imaging schedule if the imaging condition instruction contains the periodical imaging schedule, in which the imaging unit has the camera capture an image of the inspection target based on the changed periodical imaging schedule.

The disclosure of (6) makes it possible to periodically confirm the status of an inspection target.

(7) The inspection-target-image transmission system according to (1), further including a camera setting change unit (e.g. the imaging condition change module) that has the camera change a setting of the camera based on the imaging condition instruction.

The disclosure of (7) makes it possible to improve inspection efficiency by changing the settings of the camera.

(8) The inspection-target-image transmission system according to (1), further including a selection unit (e.g. communication mode setting module) that selects a combination of a standby communication mode for keeping the camera on standby and a transmission communication mode for transmitting the trimmed image of the inspection target.

The disclosure of (8) makes it possible to improve inspection efficiency by selecting combination of a standby communication mode and a transmission communication mode.

(9) The inspection-target-image transmission system according to (8), further including a change unit that changes the selected combination.

The disclosure of (9) makes it possible to improve inspection efficiency by changing the combination of a standby communication mode and a transmission communication mode.

(10) The inspection-target-image transmission system according to (1), in which the transmission unit that transmits setting information of the camera (e.g. an area to be trimmed, firmware version, exposure adjustment value, flash intensity, resolution) together with status information (e.g. battery level, signal strength, or error logs).

The disclosure of (10) makes it possible to improve inspection efficiency by transmitting setting information and status information of the camera.

(11) An inspection-target-image transmission method executed by a computer that transmits an image of an inspection target, the image having been captured by a camera, including the steps of:

having the camera periodically check whether or not there exist an imaging condition instruction and a trimming condition instruction in storage locations for the respective instructions (e.g. Step S40);

having the camera change the imaging condition and capture an image of an inspection target based on the existing imaging condition instruction and capture an image of an inspection target based on the existing imaging condition instruction (Steps S42, S44);

having the camera change the trimming condition and trim the image of the inspection target, the image having been captured by the camera, based on the existing trimming condition instruction (e.g. Steps S60, S62);

having the camera switch from a standby communication mode to a transmission communication mode and transmit the trimmed image of the inspection target (e.g. Steps S63, S64); and having the camera switch back from the transmission communication mode to the standby communication mode when the image transmission is completed (e.g. Step S65).

(12) A computer-readable program causing a computer that transmits an image of an inspection target, the image having been captured by a camera, to execute the steps of:

having the camera periodically check whether or not there exist an imaging condition instruction and a trimming condition instruction in storage locations for the respective instructions (e.g. Step S40);

having the camera change the imaging condition and capture an image of an inspection target based on the existing imaging condition instruction and capture an image of an inspection target based on the existing imaging condition instruction (Steps S42, S44);

having the camera change the trimming condition and trim the image of the inspection target, the image having been captured by the camera, based on the existing trimming condition instruction (e.g. Steps S60, S62);

having the camera switch from a standby communication mode to a transmission communication mode and transmit the trimmed image of the inspection target (e.g. Steps S63, S64); and having the camera switch back from the transmission communication mode to the standby communication mode when the image transmission is completed (e.g. Step S65).

What is claimed is:

1. An inspection-target-image transmission system that transmits an image of an inspection target, the image having been captured by a camera, comprising a processing circuitry that performs operations including:

periodically checking, with the camera, whether or not there exist an imaging condition instruction and a trimming condition instruction in storage locations for the respective instructions;

changing, with the camera, the imaging condition and capture an image of an inspection target based on the existing imaging condition instruction;

updating, with the camera the trimming condition and trim the image of the inspection target, the image having been captured by the camera, based on the existing trimming condition instruction;

selecting a combination of a standby communication mode for keeping the camera on standby and a transmission communication mode for transmitting the trimmed image of the inspection target based on a previously set initial consumption current;

switching, with the camera, from a standby communication mode to a transmission communication mode and transmit the trimmed image of the inspection target; and switching back, with the camera, from the transmission communication mode to the standby communication mode when the image transmission is completed.

2. The inspection-target-image transmission system according to claim 1, further comprising periodically checking, with the camera, whether or not there exits a recording condition instruction in the storage location;

changing, with the camera, the recording condition and record a sound around the inspection target based on the checked recording condition instruction; and transmitting, with the camera, the recorded sound around the inspection target.

3. The inspection-target-image transmission system according to claim 1, wherein, in the standby communication mode, the average consumption current per hour is 1 mA or less.

4. The inspection-target-image transmission system according to claim 1, further comprising setting a resolution of an image of the inspection target; and trimming the image of the inspection target at the set resolution.

5. The inspection-target-image transmission system according to claim 1, further comprising checking, with the camera, whether or not there exists a trimming condition instruction in the storage location;

overwriting the imaging condition previously used with the imaging condition newly checked and captures an image of the inspection target; and overwriting the previously used trimming condition with the newly checked trimming condition and trims the image of the inspection target.

6. The inspection-target-image transmission system according to claim 1, further comprising changing the imaging condition to a periodical imaging schedule if the imaging condition instruction contains the periodical imaging schedule, wherein capturing, with the camera, an image of the inspection target based on the changed periodical imaging schedule.

7. The inspection-target-image transmission system according to claim 1, further comprising changing a setting of the camera based on the imaging condition instruction.

8. The inspection-target-image transmission system according to claim 1, further including changing the selected combination.

9. The inspection-target-image transmission system according to claim 1, further comprising transmitting setting information of the camera together with status information.

10. The inspection-target-image transmission system according to claim 1, wherein the standby communication mode has an average consumption current of 1 mA or less per hour, the standby communication mode consuming less current than the transmission communication mode, and the transmission communication mode has an average consumption current of more than 1 mA per hour, the transmission communication mode consuming at least a current necessary to transmit an image trimmed by the camera.

11. The inspection-target-image transmission system according to claim 1, further comprising selecting a combination of the standby communication mode and the transmission communication mode based on input from a user.

12. The inspection-target-image transmission system according to claim 1, further comprising receiving input for each of the standby communication mode and the transmission communication mode from a user.

13. The inspection-target-image transmission system according to claim 1, wherein the standby communication mode and the transmission communication mode are selected from a plurality of consumption currents based on input from a user.

14. The inspection-target-image transmission system according to claim 1, wherein the standby communication mode and the transmission communication mode are selected based on a consumption current directly input from a user.

15. An inspection-target-image transmission method executed by a computer that transmits an image of an inspection target, the image having been captured by a camera, including the steps of:

periodically checking, with the camera whether or not there exist an imaging condition instruction and a trimming condition instruction in storage locations for the respective instructions;

changing, with the camera, the imaging condition and capture an image of an inspection target based on the existing imaging condition instruction;

updating, with the camera, the trimming condition and trim the image of the inspection target, the image having been captured by the camera, based on the existing trimming condition instruction;

selecting a combination of a standby communication mode for keeping the camera on standby and a transmission communication mode for transmitting the trimmed image of the inspection target based on a previously set initial consumption current;

switching, with the camera from a standby communication mode to a transmission communication mode and transmit the trimmed image of the inspection target; and switching back, with the camera, from the transmission communication mode to the standby communication mode when the image transmission is completed.

* * * * *